United States Patent [19]

Shrum

[11] E Re. 30,380

[45] Reissued Aug. 26, 1980

[54] MOLD FOR CONTINUOUS CASTING OF METAL

[76] Inventor: Lorne R. Shrum, 820 Manchester Rd., London, Ontario, Canada, N6H 4J6

[21] Appl. No.: 726,940

[22] Filed: Sep. 27, 1976

Related U.S. Patent Documents

Reissue of:

[64] Patent No.: 3,927,546
Issued: Dec. 23, 1975
Appl. No.: 515,072
Filed: Oct. 15, 1974

[30] Foreign Application Priority Data

Nov. 6, 1973 [GB] United Kingdom ..... 51531/73

[51] Int. Cl.[2] ..... B21D 26/08
[52] U.S. Cl. ..... 72/56; 29/421 E
[58] Field of Search ..... 72/56, 54; 29/421

[56] References Cited

U.S. PATENT DOCUMENTS

| | | | |
|---|---|---|---|
| 2,969,758 | 1/1961 | Howlett, Jr. et al. | 29/421 E X |
| 3,153,848 | 10/1964 | Glyman et al. | 29/421 E |
| 3,160,952 | 12/1964 | Corney et al. | 29/421 E X |
| 3,172,199 | 3/1965 | Schmidt | 29/421 E |
| 3,364,561 | 1/1968 | Barrington | 29/421 E X |
| 3,433,039 | 3/1969 | Henrinsen | 72/56 |

*Primary Examiner*—Milton S. Mehr
*Attorney, Agent, or Firm*—Ridout & Maybee

[57] ABSTRACT

Tubular copper moulds used in the continuous casting of metals are formed or reformed by an explosive forming technique, involving placing a mould preform or used mould over an arbor having an external surface with the profile and finish required of the finished mould, jacketing the assembly with an explosive charge, submerging the jacket assembly in a liquid, detonating the charge from one end and drawing the formed mould off the arbor.

10 Claims, 1 Drawing Figure

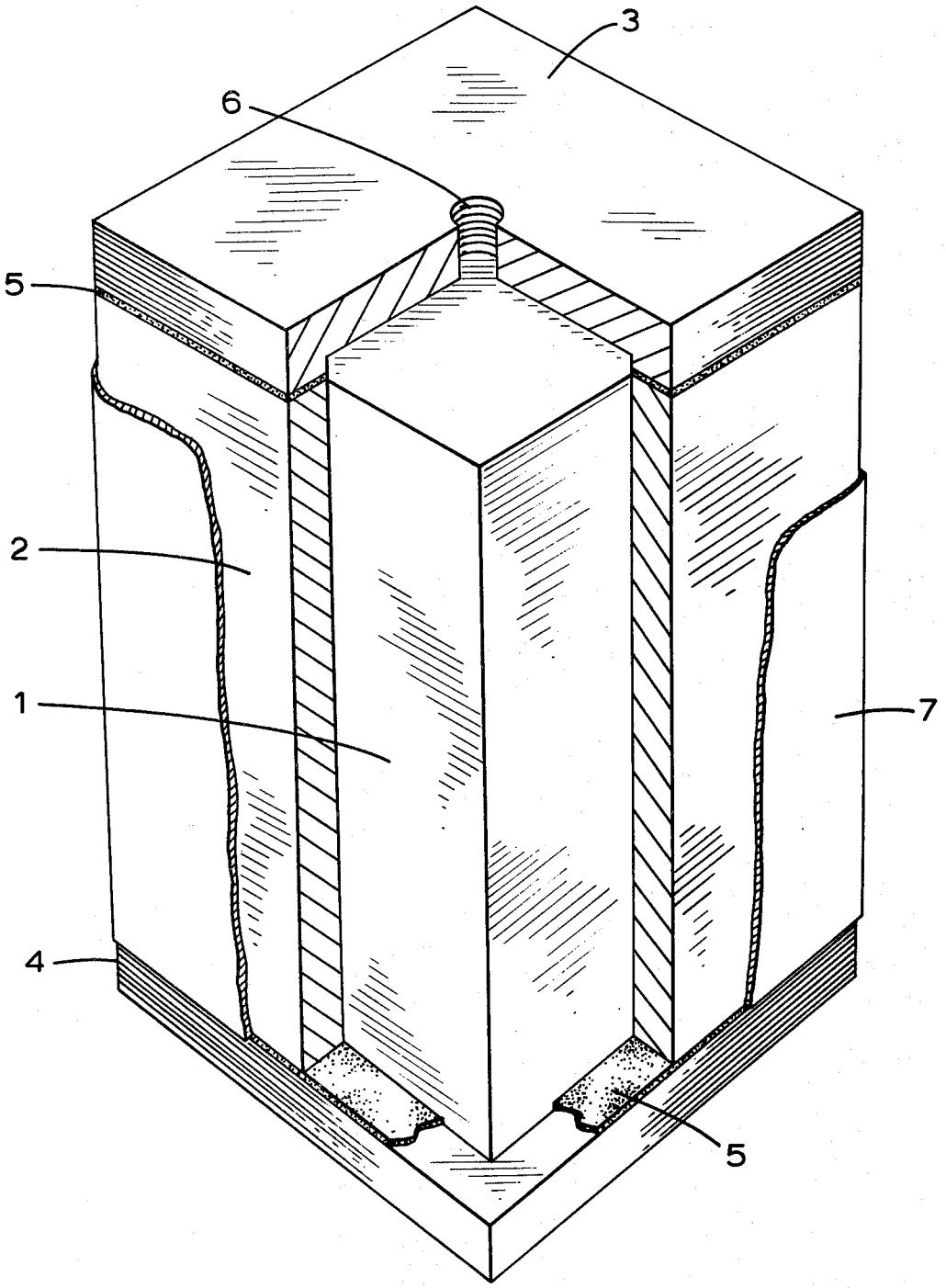
3
6
5
2
1
7
4
5

MOLD FOR CONTINUOUS CASTING OF METAL

Matter enclosed in heavy brackets [ ] appears in the original patent but forms no part of this reissue specification; matter printed in italics indicates the additions made by reissue.

The present invention relates to a method of forming a tubular copper mould for the continuous casting of metals and more particularly to a method of forming a continuous casting mould of unitary construction by explosive forming techniques.

Various problems have confronted the continuous casting arts in the formation of copper moulds through which the molten metal is cast. Thus, for example, tubular moulds, which may be curved or straight, are presently made from extruded tubing and have a cavity with a cross section usually of from 2 inch by 2 inch up to 6 inch by 6 inch and occasionally up to approximately 10 inch by 12 inch. These moulds suffer from lack of accuracy, particularly when they are bent into a required curve, and whilst they are permitted to have in the order of 0.025 inch error when checked over their length with a profile template this applies only to an external curved surface and is not necessarily maintained over the inner surface. Furthermore, a degree of spiral or twist has to be accepted. It can be appreciated that casting of molten metal into and pulling of the cast through such moulds can be very unsatisfactory. Furthermore, dependent on their degree of inaccuracy, the moulds have a very erratic service life. These moulds also suffer from a lack of design freedom since the cross section cannot be varied through the length of the mould so as to obtain maintenance of contact with the billet as it solidifies and is withdrawn. A further drawback with known tubular moulds is that they cannot at present be salvaged for re-use other than as scrap metal.

To obtain greater design freedom and accuracy segmental moulds may be formed from plate and mechanically assembled. Since it has not been practical to machine curved and tapered walls into mould cavities, each segment is machined separately and joints results between abutting segments when the mould is assembled. No matter how well the segments fit together, these joints deteriorate in use and result in gaps between segments, with defects being imparted to the cast product which are difficult to eliminate in subsequent rolling operations. The mould life is short and defective product is obtained. Segmental moulds can be reconditioned only a few times and by expensive remachining operations.

The largest continuous casting moulds are machined from solid forgings or castings and they often have specially shaped cavities for particular end products. Since wall thicknesses may be considerable, they require to contain machined cooling passages and cavities. These moulds also are made in segments, with the problems resulting therefrom as aforementioned. Large masses of expensive copper are required and machining of the cavities and cooling passages is very costly. After use, these very expensive and costly moulds are merely reduced to scrap.

The object of the present invention is to provide tubular copper moulds for continuous casting which whilst in one piece may provide mould cavities of high accuracy and free of warp or twist, which moulds may be made of any desired size or cross-sectional profile, may easily be reformed, and may be made with small wall thicknesses. Accurate moulds of appropriate cross-sectional profile can last longer and provide substantial improvements in productivity and product quality as compared with those having a design-restricted or inaccurate profile, and/or a degree of warp or twist.

A further object is to enable one piece moulds of any desired size to be fabricated, using the minimum of material and with wall thicknesses which are sufficiently small to avoid the necessity for internal passages for coolant. Yet a further object is to enable used moulds readily to be reformed for further use.

In the method of the invention an arbor or core is formed which is externally machined to the required shape of the inner casting cavity of the particular mould being formed and having the same surface finish of the required mould, a sleeve having the same general shape of the finished mould is fitted loosely over the arbor, a cover plate and base plate are fitted to the top and bottom of the arbor-sleeve assembly, a charge of high explosive material is fitted around the sleeve to form an explosive jacketed assembly, the jacketed assembly is fully immersed in a liquid, the explosive is detonated from one end of the assembly to the other to insure uniform directional propagation of the detonation path and the mould so formed is pulled from the arbor. Any required external machining is carried out on the explosively formed mould to suit the finished mould for the continuous casting equipment in which it is to be used.

The enclosed drawing illustrates in a partially broken away perspective view a typical arbor and sleeve assembly with an explosive jacket applied thereto.

Arbor 1 is shown which preferably is of metal and is externally machined to close tolerances to be externally the exact shape and have the same surface finish as that desired for the internal cavity of the finished continuous casting mould being formed. The material of the arbor is not critical provided that it will withstand the forces applied to it during forming of the mould without deformation and is sufficiently durable to be used repeatedly for as many times as may be required. For some applications an arbor of synthetic resin material will provide sufficient strength and durability. A sleeve 2 which contains sufficient copper to form the finished mould and is of the same general shape as that mould is fitted loosely over the arbor 1.

The sleeve may be prepared in various ways, according to circumstances. It may be formed of a length of extruded tubing, or it may be cast, or more especially with larger sizes of sleeve, it may be fabricated from plate copper. Alternatively the sleeve may be a used mould which requires reforming to restore the original configuration of the mould cavity. The copper of the sleeve may be fully annealed, or work hardened to a greater or lesser degree, as is discussed further below.

Cover 3 and a base plate 4 are placed securely over the top and bottom of the arbor-sleeve assembly and, by use of gaskets 5, liquid medium in which the assembly is submerged is excluded from between the arbor 1 and the preform 2, where its presence would interfere with the forming process. An exhaust port 6 may be provided through the cover 3 to enable the interior of the assembly to be evacuated. This is desirable if any appreciable air space exists between the sleeve and the arbor at any point since the resulting air pockets would otherwise interfere with the forming process.

High explosive material 7, which may be in sheet, strip, rod or cord form, is then fitted around the sleeve 2. The explosive is applied in such a manner that, when detonated, it will provide a detonation path extending longitudinally of the sleeve from one end to the other. It may be in sheet, strip, rod or cord form, and in order to provide the desired detonation path, any strips, rods or cords will extend longitudinally of the sleeve, and will be distributed around the periphery of the sleeve so as to achieve a desired distribution of the forces applied to different portions of the periphery which will not necessarily be uniform. Thus when forming moulds with angular cross-sections, the application of greater forming pressures will generally be required at the angles than upon intervening straight or curved portions of the periphery. The forming pressure applied may be controlled not only by varying the type, distribution and amount of explosive applied, but also by standing off the explosive, or part of it, from the sleeve. This stand-off modifies the characteristics of the shock wave reaching the sleeve and reduces the forming pressure applied. The necessary standoff may be achieved by interposing rubber sheet or strip of suitable thickness between the explosive and the sleeve, or by providing a frame or cage surrounding the sleeve and supporting the explosive at the required stand-off distance.

The amount of explosive used and the manner in which it is applied is related to the properties of the copper forming the sleeve, the form of the sleeve, and whether the sleeve is being formed for the first time or is a used mould being reformed.

The forming pressures required are in the order of 10 times the yield stress of the copper of the sleeve for new sleeves, and somewhat higher for used moulds being reformed. The yield stress of fully annealed copper is about 9000 lb/sq.in. rising to about 40,000 lb/sq.in. for hardened copper. The forming pressure utilized will also be dependent on the degree of work hardening of the copper desired during the forming process. With an initial hardness of 45 Brinell (500 Kg load) there is no difficulty in achieving a hardness of 75 Brinell (500 Kg load) on the internal surface of the mould in contact with the arbor when no stand-off is used to separate the explosive from the external face. Under the same circumstances, the external surface of the mould will be hardened to over 100 Brinell (500 Kg load). A higher degree of hardening of the internal mould surface may be achieved if desired by prehardening this surface. The type and quantity of explosive and the degree of stand-off used may be varied according to known techniques in the use of explosives so as to apply the required forming pressures to the sleeve when the explosive jacketed assembly is submerged in liquid and the explosive detonated.

Explosive is used which has a relatively high detonation velocity such as, for example one containing PETN (pentaerithritol-tetranitrate). A shock wave must be generated of such magnitude as to move the sleeve into intimate contact with the arbor and achieve plastic flow of the inner surface of the sleeve in contact with the arbor. The shock wave must travel at a much higher speed than the propagation velocity of sound through the liquid in which the assembly is immersed, which is about 1500 meters per second in the case of water. An explosive sold by the DuPont Company under the trade mark "Primacord" is most useful in that it produces a shock wave having a velocity of about 6000 meters per second. This explosive is in cord form. A suitable explosive in sheet or strip form is that sold by the DuPont Company under the designation "Detasheet" (Trade Mark) C.

The liquid explosive used to submerge the explosive jacketed assembly is advantageously water, and the explosive is detonated from one end of the assembly to the other to insure uniform directional propagation of the explosion. Detonation is carried out under a liquid to cause sufficient use of the explosive energy and to eliminate noise problems. Furthermore, detonation should be carried out in a pit located below floor or ground level, thereby readily containing the explosive forces and avoiding the necessity for continually replacing containers which are damaged by repeated detonations.

The detonation may be carried out in any liquid which will transmit the required forces to the preform and the explosive jacketed assembly must be covered with a great enough depth of liquid to insure proper disposition of the explosive forces. Water is, of course, the most advantageous liquid to use because of its cheapness and the complete insignificance of any loss thereof. Generally, it is found that a coverage of in the order of two feet of water or more over the assembly is necessary for efficient disposition of the explosive energy.

After detonation the assembly is removed and the formed sleeve is drawn off the arbor 1 to provide a mould with an inner casting cavity having a shape exactly complementary to that of the arbor 1. The mould may be machined externally as desired to suit the equipment with which it is to be used. Only enough material need be used to provide a mould wall thickness of between in the order of $\frac{3}{8}$ inch to not more than about 2 inch, depending on the application, and most moulds are less than 3 feet long.

The invention is further illustrated by the following examples.

EXAMPLE I. FORMING OF A BLOOM MOULD

A rectangular sleeve of cast annealed copper was prepared having a wall thickness of $1\frac{1}{2}$ inches and a length of 28 inches so as to be a loose fit over a steel arbor of the same length and a cross-section of 9 inches by 10.5 inches. Gasketed end plates were applied to the ends of the assembly to seal off the interior of the assembly which was evacuated. Four strips of "Detasheet" C explosive, having a weight of 2 grams/sq.in., and each [1,125] *1.125* inches wide by 28 inches long were applied to the corners of the sleeve over a 0.125 inch stand-offs of sheet rubber. Two 28 inch strands of 60 grains/foot "Primacord" explosive were applied to each side of the sleeve between the corners over stand-offs of 0.25 inch sheet rubber. The assembly was submerged in a waterfilled pit so as to provide a two foot cover of water and the explosive charge, which totalled 5,560 grains, detonated from one end of the sleeve. The assembly was taken out of the pit, the end plates removed, and the sleeve readily withdrawn from the arbor. The internal surface of the mould formed by the sleeve was found to have assumed accurately the configuration and surface finish of the arbor.

EXAMPLE II. FORMING AND REFORMING OF BILLET MOULDS

[a.] *(a)* A square sleeve, 32 inches long, of hardened copper was loosely fitted over a 5.25 inch square arbor of the same length, and after applying end covers and evacuating the interior of the assembly as in the previous example 32 strands of 60 grain/foot "Primacord" explosive each 32 inches long were applied to a support surrounding the sleeve, 4 strands being mounted within the support adjacent each corner of the sleeve so as to provide a 0.125 inch stand-off between the explosive and the sleeve and 4 strands being mounted outside the support adjacent each flat surface of the sleeve so as to provide a 0.3125 inch stand-off between the explosive and the sleeve.

The assembly was then submerged and the explosive detonated as in the previous example, the total explosive charge being 5,125 grains.

The cavity of the mould so formed was found to be an exact complement, as to configuration and finish, of the arbor utilized.

[b.] *(b)* A similar procedure was applied to the mould formed in (a) in order to reform it after use. However, the "Primacord" explosive at the corners was replaced by a 1.125×32 inch strip of 2 gm/sq.in. "Detasheet" at each corner with a 0.125 in rubber sheet stand-off, and only 2 strands of "Primacord" explosive were placed adjacent each flat surface of the sleeve. Results were equally satisfactory. The total charge in this case was 5730 grains.

[c.] *(c)* The procedure of (b) was repeated using a 4 inch by 6 inch arbor having curved surfaces, and appropriately shaped 32 inch long sleeves, both on newly preformed and worn moulds. The total charge in these cases was again 5730 grains, and results were again satisfactory.

The present method provides a continuous casting mould which has in the mould cavity accuracies beyond that required for successful operation of the mould, there being an absence of any spiral or twist, thereby allowing for easy withdrawal of the cast metal therefrom. Because it is the external surface of the arbor which is machined it is practical to form any design of variable cross section which is faithfully reproduced in the casting cavity of the mould and there are no design limitations on the cross-sectional profiles which can be produced within the mould. Furthermore, there are absolutely no joints in the moulds formed by the method of the invention and spend moulds can be readily resized by the method of the invention and reused. The amount of raw material required for moulds is reduced substantially by the present method, a very important item to consider with respect to very large moulds where material savings of at least 60 to 80 percent may be achieved. Also costly machining of cooling water passages in large moulds and of the mould cavities is eliminated.

What I claim is:

1. A method of forming a tubular copper mould for the continuous casting of metals, comprising the steps of:

forming an arbor having an external surface having the profile and finish required of the finished mould, fitting a copper sleeve of the same general shape as the finished mould on the arbor, surrounding the sleeve with a charge of high explosive material providing a detonation path extending longitudinally of the sleeve, fully immersing the sleeve and its surrounding charge in a liquid, detonating the charge so as to apply a pressure to the sleeve sufficient to cause plastic flow in the material thereof, and withdrawing the arbor from the sleeve.

2. The method of claim 1, including the step of fitting a cover plate and a base plate to the top and bottom ends of the sleeve/arbor assembly.

3. The method of claim 2, including the step of evacuating air from between the sleeve and the arbor prior to detonation of the charge.

4. The method of claim 1, wherein the explosive charge is applied in strips or cords extending longitudinally of the sleeve.

5. The method of claim 1 wherein the explosive charge is at least in part spaced from the sleeve.

6. The method of claim 5 wherein the explosive charge is spaced from the sleeve by the interposition of rubber.

7. The method of claim 5 wherein the explosive charge is spaced from the sleeve by mounting it on a support surrounding the sleeve.

8. The method of claim 1 wherein the explosive used has a detonation velocity substantially greater than the propagation velocity of sound through the liquid in which the sleeve is immersed.

9. The method of claim 8 wherein the explosive used has a detonation velocity of about 6000 meters/second, and the liquid in which the sleeve is immersed is water.

10. The method of claim 1 wherein the sleeve is a used mould requiring reforming.

* * * * *